United States Patent Office 3,026,243
Patented Mar. 20, 1962

3,026,243
CONTROL OF THE OLIVE FLY BY APPLICATION OF PRODUCTS CONTAINING O,O-DIMETHYL-THIOPHOSPHORYLACETIC ACID MONOMETH-YLAMIDE
Pietro de Pietri Tonelli, Signa, Florence, Giuseppe Losco and Giorgio Rossi, Milan, and Romano Santi, Signa, Florence, Italy, assignors to Montecatini Società Generale per l'Industria Mineraria e Chimica, Milan, Italy, a corporation of Italy
No Drawing. Filed Mar. 3, 1959, Ser. No. 796,755
Claims priority, application Italy Sept. 4, 1958
2 Claims. (Cl. 167—22)

A number of N-alkyl amides of dialkyldithiophosphorylacetic acids represented by the general formula

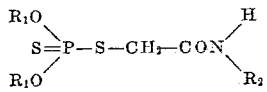

wherein $R_1$ and $R_2$ are low molecular weight alkyl radicals, are known, which amides have interesting insecticidal properties.

Some of these compounds, in particular the N-methylamide of O,O-dimethylphosphorylacetic acid and the N-isopropylamide of O,O-diethyldithiophosphorylacetic acid, have been widely used for the control of a number of parasites of plants, and for control of house insects.

However, this pest control activity of the aforementioned compounds is associated with a certain degree of toxicity on the warm-blooded animals, which is nevertheless much lower than the toxicity of other known pesticide phosphoric esters.

It has now been found by the applicants that the N-monomethylamide of O,O-dimethylthiophosphorylacetic acid:

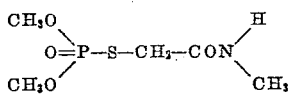

presents especially desirable characteristics, not only because of its unpredictable specific biological activity against the olive fly, Dacus oleae, but also due to the following fact having great health and economical importance. Namely, this compound passes only in practically negligible amounts into the oils obtained from olives treated therewith, even when the olives are picked up and pressed only one day after the treatment with doses thereof of practical use in fly control. These oils are therefore perfectly comestible.

Said compound is prepared according to a known general method involving reaction between an alkaline salt of dimethylthiophosphoric acid and an alkyl amide of monochloracetic acid, which reaction can be carried out in water, or also in an organic solvent capable of dissolving both reactants, at ordinary temperature or with moderate heating.

The reaction product can be isolated by evaporation of the solvent after separation of the mineral salt, or by extraction with a suitable solvent in case the reaction has been carried out in water.

A further purification can be carried out by distillation under a very reduced pressure.

An example of preparation of the N-methylamide of O,O-dimethyldithiophosphorylacetic acid is the following: 164 g. sodium O,O-dimethylthiophosphate and 107 g. N-methylchloroacetamide are dissolved in 80 cc. water. The mixture is left standing at room temperature for 70 hours. Thereafter the crystalline sodium chloride precipitated during this standing period is filtered off and the aqueous phase is extracted several times with chloroform. The combined chloroform extracts are dehydrated with anhydrous $Na_2SO_4$ and then concentrated by moderate heating until the solvent is eliminated.

The residue is then washed on a boiling water bath, under a pressure of 0.1–0.2 mm. Hg, in order to eliminate the unchanged monochloroacetamide. 80 g. are obtained of a residue essentially consisting of the afore-mentioned N-methylamide, which can be obtained in the pure state by distillation under reduced pressure (boiling point 150–152° C. at 0.1–0.2 mm. Hg).

The pure product is a colorless or slightly yellow oil, soluble in water, alcohol, acetone, benzene, dioxane, and dimethylacetamide, scarcely soluble in ethyl ether, and almost insoluble in petroleum ether.

Its index of refraction is $n_D^{20}=1.4987$. The elementary analysis carried out on the distilled product, gives the following results:

| | Percent |
|---|---|
| P found | 14.41–14.31 |
| P calculated for $C_{15}H_{12}O_4PSN$ | 14.53 |
| S found | 15.85–15.4 |
| S calculated for $C_{15}H_{12}O_4PSN$ | 15.04 |

As stated above, the herein-claimed compound has a specific activity against Dacus oleae (olive fly) remarkably higher than that of other known compounds.

The active compound is employed in variously formulated compositions containing, e.g., in addition to the active product in the afore-mentioned concentration, also a wetting agent and an inert diluent, such as diatomaceous earth, etc.

As a demonstration of what we have said above, in Table 2 are reported the results of two series of field tests for comparing the anti-dacus activity of the compound claimed here, designated A, with that of the N-monomethylamide of O,O-dimethyldithiophosphorylacetic acid, designated B.

In the first test, dusting powder formulations are compared with wettable powder formulations, the latter being used in doses of 0.6% of active product with normal volume sprayings. The persistence of activity of the tested products is evident from the following Table 1.

Table 1.—*Living Individuals Present on 400 Green Olives With Stings but Without Any Outlet Hole, Picked up From Plants Treated With Various Test Formulations at Two Different Times After the Treatment*

| Interval between— | | Experimental formulations | No. small larvae | No. average larvae | No. big larvae | No. pupae | No. total |
|---|---|---|---|---|---|---|---|
| the treatment and the picking up, days | the picking up and the examination, days | | | | | | |
| 34 | 12 | Dusting powder A, 3% | 3 | 9 | 31 | 6 | 49 |
| | | Dusting powder B, 3% | 35 | 41 | 57 | 1 | 134 |
| | | Wettable powder A, 3°/oo | 2 | 0 | 1 | 0 | 3 |
| | | Wettable powder B, 3°/oo | 3 | 1 | 2 | 0 | 6 |
| | | Control | 44 | 92 | 134 | 16 | 286 |
| 49 | 10 | Dusting powder A, 3% | 103 | 72 | 244 | 32 | 451 |
| | | Dusting powder B, 3% | 78 | 48 | 241 | 23 | 390 |
| | | Wettable powder A, 3°/oo | 44 | 16 | 21 | 2 | 83 |
| | | Wettable powder B, 3°/oo | 65 | 25 | 59 | 4 | 153 |
| | | Control | 75 | 70 | 279 | 36 | 460 |

In the second test, two formulations of wettable powders, in the reduced dose of 0.2‰ active compound, have been used in order to stress the differences, if any, in the persistence of activity of the two products.

The following experimental formulations have been used:

Formulation 1=wettable powder with 20% A—1‰
Formulation 2=wettable powder with 20% B—1‰
Formulation 3=control The results of the examinations are reported in the following table.

Table 2.—*Individuals Present on 400 Olives, With Sting and Without Outlet Hole, Picked up at Various Periods After the Treatment and Examined After About Ten Days From the Picking up*

| Biological stages | 1st examination—olives picked up 20 days after the treatment | | | 2nd examination—olives picked up 29 days after the treatment | | | 3rd examination—olives picked up 40 days after the treatment | | |
|---|---|---|---|---|---|---|---|---|---|
| | formulations | | | formulations | | | formulations | | |
| | 1 | 2 | 3 | 1 | 2 | 3 | 1 | 2 | 3 |
| small larvae | 0 | 1 | 117 | 12 | 48 | 129 | 57 | 37 | 24 |
| average larvae | 0 | 0 | 63 | 3 | 8 | 119 | 54 | 36 | 65 |
| big larvae | 0 | 0 | 120 | 1 | 6 | 183 | 93 | 128 | 421 |
| pupae larvae | 0 | 0 | 56 | 0 | 0 | 29 | 3 | 10 | 47 |
| total | 0 | 1 | 356 | 16 | 62 | 460 | 207 | 211 | 557 |

From these data it appears therefore that in an open field the persistence of anti-Dacus activity of compound A is higher than that of compound B.

As said above, the herein-claimed compound presents the singular, unpredictable, and valuable property of being much more soluble in water than in oil, in which, we emphasize, its solubility can be defined as negligible.

In order to show this fact experimentally, tests have been carried out to establish to what extent the compound A has, in comparison with compound B, a more favorable distribution in the aqueous material, which fact would obviously result in a higher elimination of the active compound during the pressing of the olives.

Therefore a number of olive plants were treated with a formulation of wettable powders, containing 20% B, at a concentration of 3‰ (0.6‰ of active product) and with an equal formulation containing the compound A at the same concentration.

1 day and 7 days after the treatment, some amounts of olives (about 70 kg.) were picked up, crushed, and pressed, to extract the oil according to the conventional process. The amounts of compounds A and B were determined in the oil obtained, employing the methods described in the two following reports: B. Bazzi, P. de Pietris-Tonelli and R. Santi, "Methods for the Chemical and Biological Microdetermination of the Residues of N-Monomethylamide of O,O-Dimethyl-Dithiophosphoryl-acetic Acid," Soc. Montecatini, 1956. B. Bazzi and R. Santi, "Improvements in the Method of Chemical Determination of Residues of N-methylamide of O,O-Dimethyl-dithiophosphoryl Acetic Acid in Olive Oil," "Oliviculture," XIII, April 3, 1958.

The results obtained by chemical and biological analytical methods are reported in Table 3.

Table 3.—*Amounts of Active Substance Determined in Oils Deriving From Olives Treated With B and A (Concentration of 0.6‰ Active Substance) and Picked up 1 Day and 7 Days After the Treatment*

| Interval of time between the treatment and the picking of the olives | Results of the microdeterminations | | | |
|---|---|---|---|---|
| | B, p.p.m. | | A, p.p.m. | |
| | Chemical determination (based on P) | Biological determination | Chemical determination (based on P) | Biological determination |
| 1 day | 1.04 | 1.00 | 0.19 | 0.2 |
| 7 days | 0.69 | 0.65 | 0.06 | 0.2 |

From the results reported in Table 3 it appears evident that in the oil obtained from the olives treated with A the active principle is present in minimum amounts even 1 day after the treatment, in contrast to those treated with compound B.

Considering the fact that, in the drupes treated with A or B, considerable amounts of active substance can be present 24 hours after the treatment, the data reported in Table 3 would indicate a preferential distribution of A in the aqueous material which is remarkably higher than that of B.

The afore-mentioned hypothesis was confirmed by determining the solubility of A and B in the oil and in the vegetation water deriving from drupes subjected to pressing according to the conventional process.

The results obtained are reported in Table 4.

Table 4.—*Solubility of A and B in Olive Oil and in the Aqueous Material*

| Product tested | Solubility in grams per 100 g. (20–22° C.) | |
|---|---|---|
| | Olive oil | Aqueous material |
| B | 1 | 2.35–2.5 |
| A | <0.2 | ∞ |

From the data reported in Table 4 the different solubility of A in the aqueous material and in olive oil respectively, in comparison with that of B, is evident.

It is thus possible to explain the results obtained by the analysis relating to the oils deriving from plants treated with A and B, and reported in Table 3.

In relation to acute toxicity, the comparative data, expressed as L.D. 50 (mg. product per kg. of living body), obtained by operating on mixed populations of white rats, are reported hereinbelow.

*Table 5*

| Product | L.D. 50, mg./kg. | Trust limits (for P=0.05) of the LD 50 (calculated according to the method of Litchfield and Wilcoxon) |
| --- | --- | --- |
| Compound A (N-methylamide of O,O-dimethylthiophosphorylacetic acid) | 27 | 25.7–28.3 |
| Compound B (N-methylamide of O,O-dimethyldithiophosphorylacetic acid) | 120 | 110.1–129.6 |
| N-isopropylamide of O,O-diethyldithiophosphorylacetic acid | 28 | 25.8–30.4 |
| Parathion | 12.5 | |

In the dusting powder 95% talc is added as the inert powder, whereas in the wettable powder 75% kieselguhr (diatomaceous earth) is contained as the inert powder, the water being employed as diluent.

We claim:
1. A composition for the control of the olive fly, *Dacus oleae*, containing N-monomethylamide of O,O-dimethylthiophosphorylacetic acid as active substance.
2. In the art of production of olive oil, in which the infestation of the olives on the olive tree by *Dacus oleae* is controlled by applying insecticide thereto, and the olives are thereafter pressed to remove the olive oil and aqueous vegetative juices, and the olive oil separated from the aqueous juices, the improvement comprising applying as said insecticide the compound of the formula

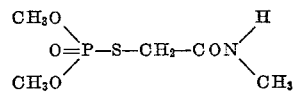

said compound being characterized by very low solubility in the olive oil and relatively high solubility in the aqueous juices.

References Cited in the file of this patent
UNITED STATES PATENTS
2,494,283    Cassaday et al. _____ Jan. 10, 1950
FOREIGN PATENTS
791,824    Great Britain _____ Mar. 12, 1958
OTHER REFERENCES
Santi et al.: "Nature," vol. 183, p. 398 (Feb. 7, 1959).